(12) United States Patent
Sodagar (10) Patent No.: US 12,445,675 B2
(45) Date of Patent: Oct. 14, 2025

(54) METHOD AND APPARATUS FOR DEFINING FRAMES AND TIMED REFERENCED NETWORK ABSTRACTION LAYER (NALS) STRUCTURE IN HAPTICS SIGNALS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 93 days.

(21) Appl. No.: 18/487,590

(22) Filed: Oct. 16, 2023

(65) Prior Publication Data
US 2024/0129578 A1   Apr. 18, 2024

Related U.S. Application Data

(60) Provisional application No. 63/416,795, filed on Oct. 17, 2022.

(51) Int. Cl.
*H04N 21/435* (2011.01)
*H04N 21/43* (2011.01)

(52) U.S. Cl.
CPC ..... *H04N 21/4355* (2013.01); *H04N 21/4302* (2013.01)

(58) Field of Classification Search
None
See application file for complete search history.

(56) References Cited

U.S. PATENT DOCUMENTS

| | | | |
|---|---|---|---|
| 2009/0096632 A1* | 4/2009 | Ullrich | H04N 21/81 |
| | | | 340/407.1 |
| 2014/0347177 A1 | 11/2014 | Phan et al. | |
| 2018/0218576 A1 | 8/2018 | Bharitkar et al. | |
| 2019/0324538 A1* | 10/2019 | Rihn | G06F 3/014 |
| 2021/0397260 A1* | 12/2021 | Birnbaum | H04L 51/06 |

OTHER PUBLICATIONS

Da Costa, H., et al., "Thoughts on the ISOBMFF Box Structure for the Haptics Phase 1 Codec", Immersion Corp, Interhaptics, Interdigital, ISO/IEC JTC 1/SC 29/WG 7 m60309, Jul. 2022 (22 pages).
"Text for Working Draft of ISO/IEC 23090-31: Haptics Coding", MPEG 3D Graphics and Haptics Coding Convenorship: AFNOR, France, Jul. 7, 2022 (66 pages).
International Search Report issued Feb. 14, 2024 in International Application No. PCT/US 23/35292.
Written Opinion issued Feb. 14, 2024 in International Application No. PCT/US 23/35292.

* cited by examiner

*Primary Examiner* — Clifford Hilaire
(74) *Attorney, Agent, or Firm* — Sughrue Mion, PLLC (57) ABSTRACT

Method, apparatus, and system for haptic signal processing are provided. The process may include receiving a bitstream comprising one or more haptic channels one or more moving picture experts group (MPEG) immersive haptics stream (MIHS) units may be obtained for the one or more haptic channels, with a MIHS unit including timing information for one or more haptic effects. The process may also include timing information being obtained for the one or more haptic effects from the one or more MIHS units, the timing information for the one or more haptic effects including an offset associated with the one or more haptic effects. The one or more haptic effects may be rendered based on the obtained timing information.

17 Claims, 8 Drawing Sheets

METHOD AND APPARATUS FOR DEFINING FRAMES AND TIMED REFERENCED NETWORK ABSTRACTION LAYER (NALS) STRUCTURE IN HAPTICS SIGNALS

CROSS-REFERENCE TO RELATED APPLICATION

This application claims priority from U.S. Provisional Application No. 63/416,795, filed on Oct. 17, 2022, the disclosure of which is incorporated herein by reference in its entirety.

FIELD

This disclosure is directed to a set of advanced video coding technologies. More specifically, the present disclosure is directed to encoding and decoding haptic experience for multimedia presentation.

BACKGROUND

Haptics experience has become a part of multimedia presentation. In applications where multimedia presentation includes an aspect of haptic experience, haptic signals may be delivered to the device or wearable and the user may feel the haptic sensations during the use of the application in coordination with the visual and/or audio media experience.

Recognizing the growing popularity of haptic experience in multimedia presentations, motion picture experts group (MPEG) has started working on a compression standard (both for MPEG-DASH and MPEG-I) for haptics as well as carriage of the compressed haptics signaling in ISO based media file format (ISOBMFF).

One of the problems to be solved in involving an aspect of haptic experience within a multimedia presentation is that there is no concept of haptic frames or haptic samples. Furthermore, there is no concept of a haptic time-referenced network abstraction layer unit. Solutions addressing this problem are required.

SUMMARY

According to embodiments, a method for encoding or decoding haptic data may be provided. The method may be performed by at least one processor and may include receiving, a bitstream comprising one or more haptic channels; obtaining, from the bitstream, one or more moving picture experts group (MPEG) immersive haptics stream (MIHS) units for the one or more haptic channels, wherein a MIHS unit comprises timing information for one or more haptic effects; obtaining the timing information for the one or more haptic effects from the one or more MIHS units, the timing information for the one or more haptic effects comprises an offset associated with the one or more haptic effects; and rendering the bitstream based on the obtained timing information.

According to embodiments, an apparatus for haptic processing may be provided. The apparatus may include at least one memory configured to store program code; and at least one processor configured to read the program code and operate as instructed by the program code. The program code may include first receiving code configured to cause the at least one processor to receive a bitstream comprising one or more haptic channels; first obtaining code configured to cause the at least one processor to obtain from the bitstream, one or more moving picture experts group (MPEG) immersive haptics stream (MIHS) units for the one or more haptic channels, wherein a MIHS unit comprises timing information for one or more haptic effects; second obtaining code configured to cause the at least one processor to obtain the timing information for the one or more haptic effects from the one or more MIHS units, the timing information for the one or more haptic effects comprises an offset associated with the one or more haptic effects; and rendering code configured to cause the at least one processor to render the bitstream based on the obtained timing information.

According to embodiments, a non-transitory computer-readable medium stores computer instructions may be provided. The instructions may include one or more instructions that, when executed by one or more processors of a device for haptic processing, cause the one or more processors to receive a bitstream comprising one or more haptic channels; obtain, from the bitstream, one or more moving picture experts group (MPEG) immersive haptics stream (MIHS) units for the one or more haptic channels, wherein a MIHS unit comprises timing information for one or more haptic effects; obtain the timing information for the one or more haptic effects from the one or more MIHS units, the timing information for the one or more haptic effects comprises an offset associated with the one or more haptic effects; and render the bitstream based on the obtained timing information.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

According to an aspect of the present disclosure, methods, systems, and non-transitory storage mediums for parallel processing of dynamic mesh compression are provided. Embodiments of the present disclosure may also be applied to static meshes.

Figure 1:
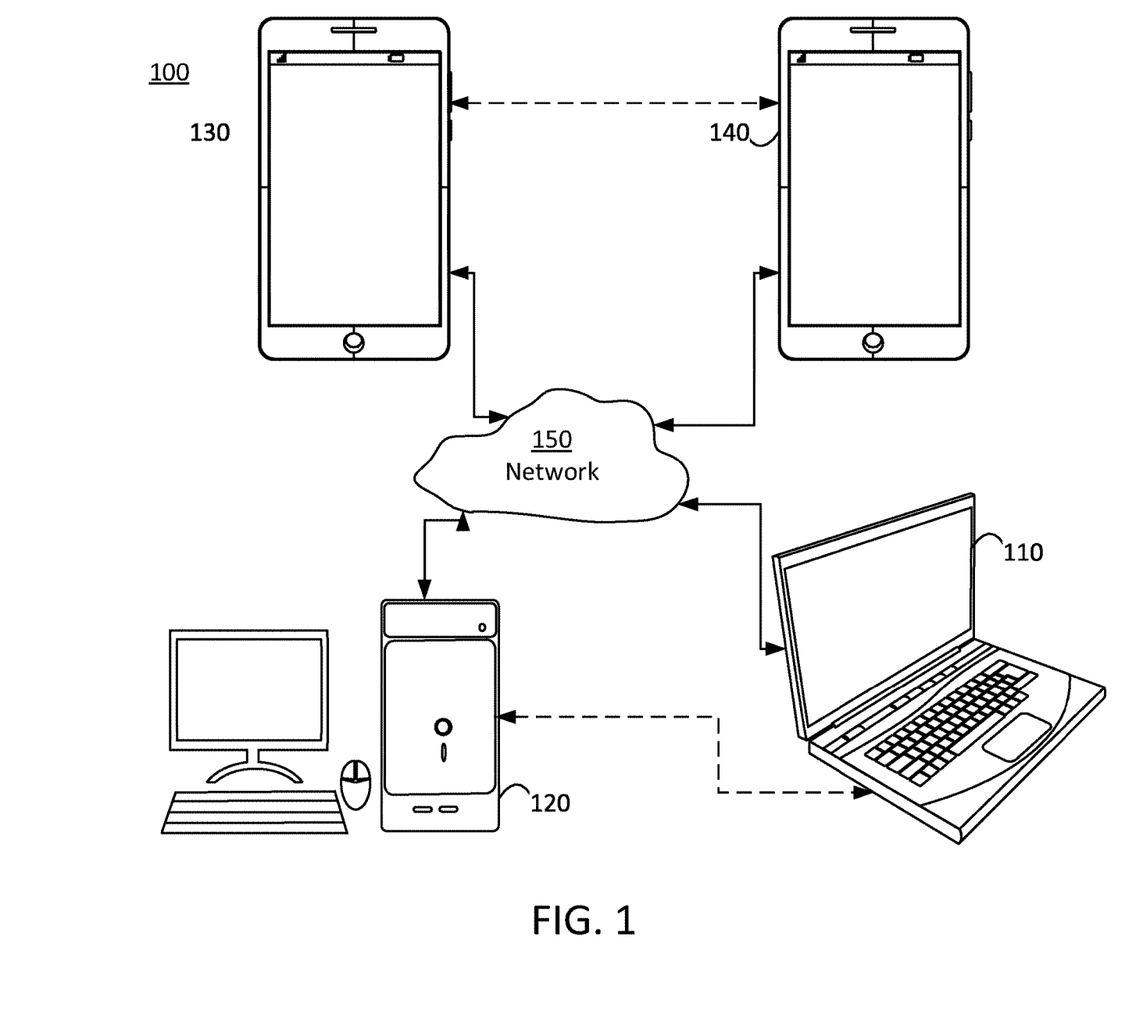
FIG. 1 is a schematic illustration of a simplified block diagram of a communication system, in accordance with embodiments of the present disclosure.
Figure 2:
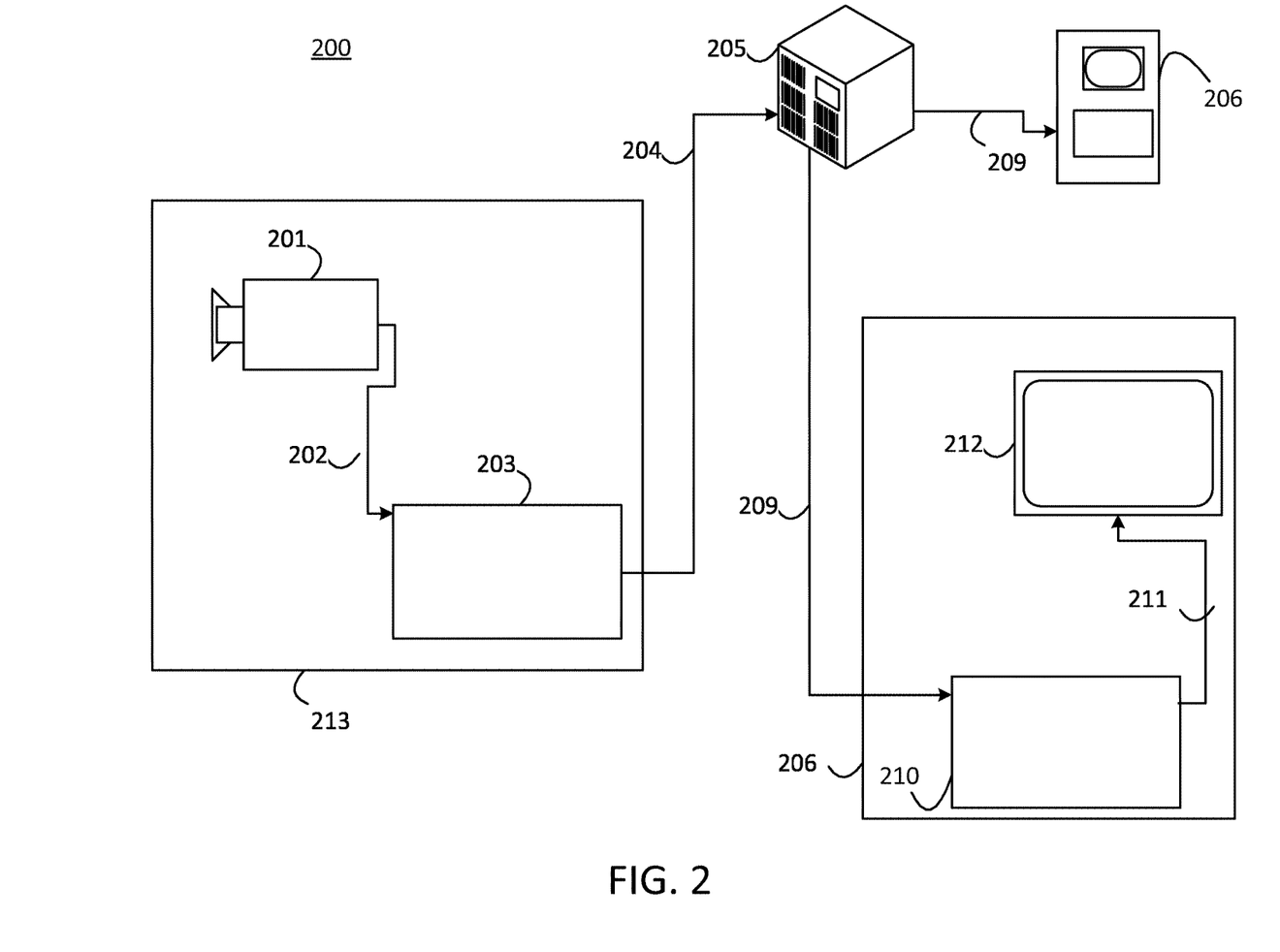
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3A:
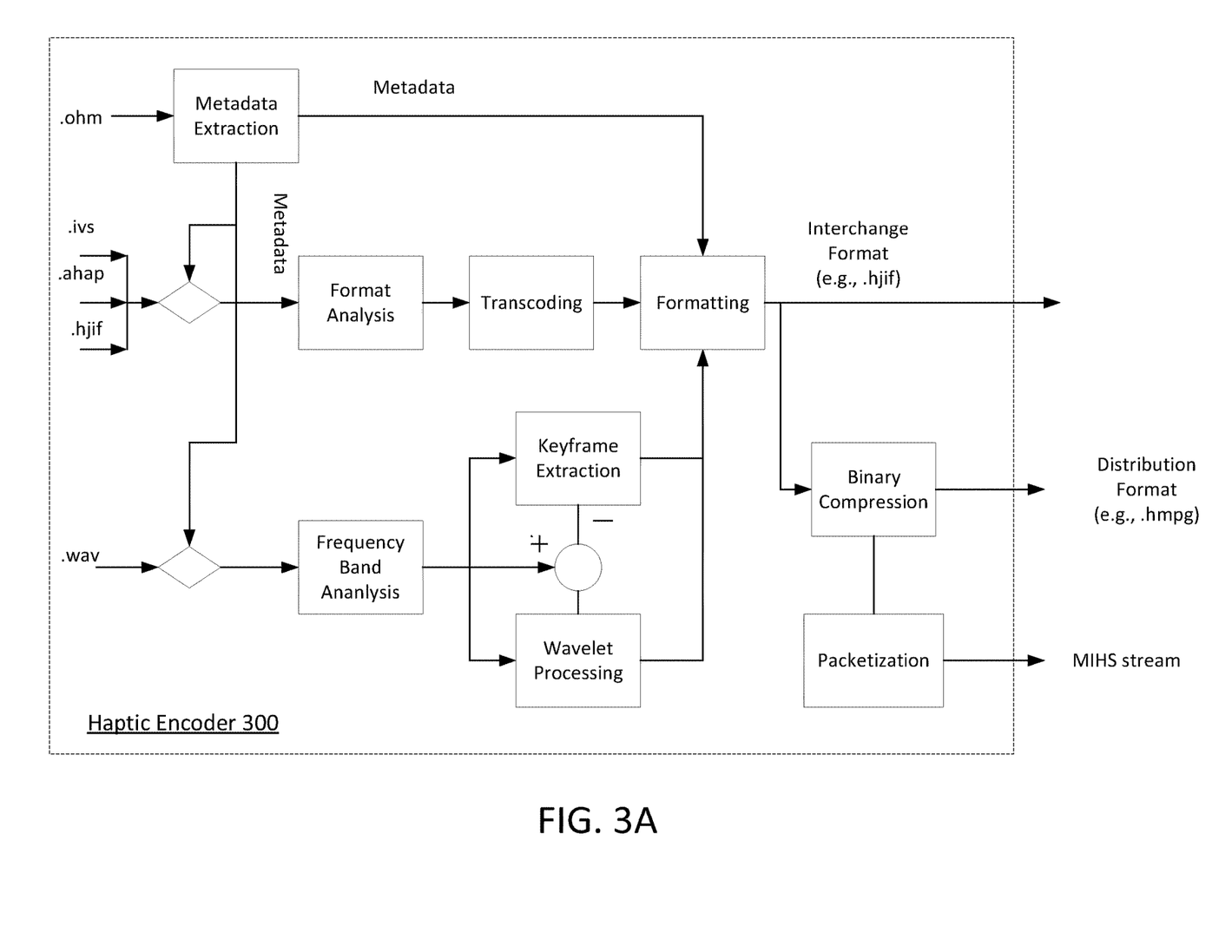
FIG. 3A is a schematic illustration of a simplified block diagram of a haptic encoder, in accordance with embodiments of the present disclosure.
Figure 3B:
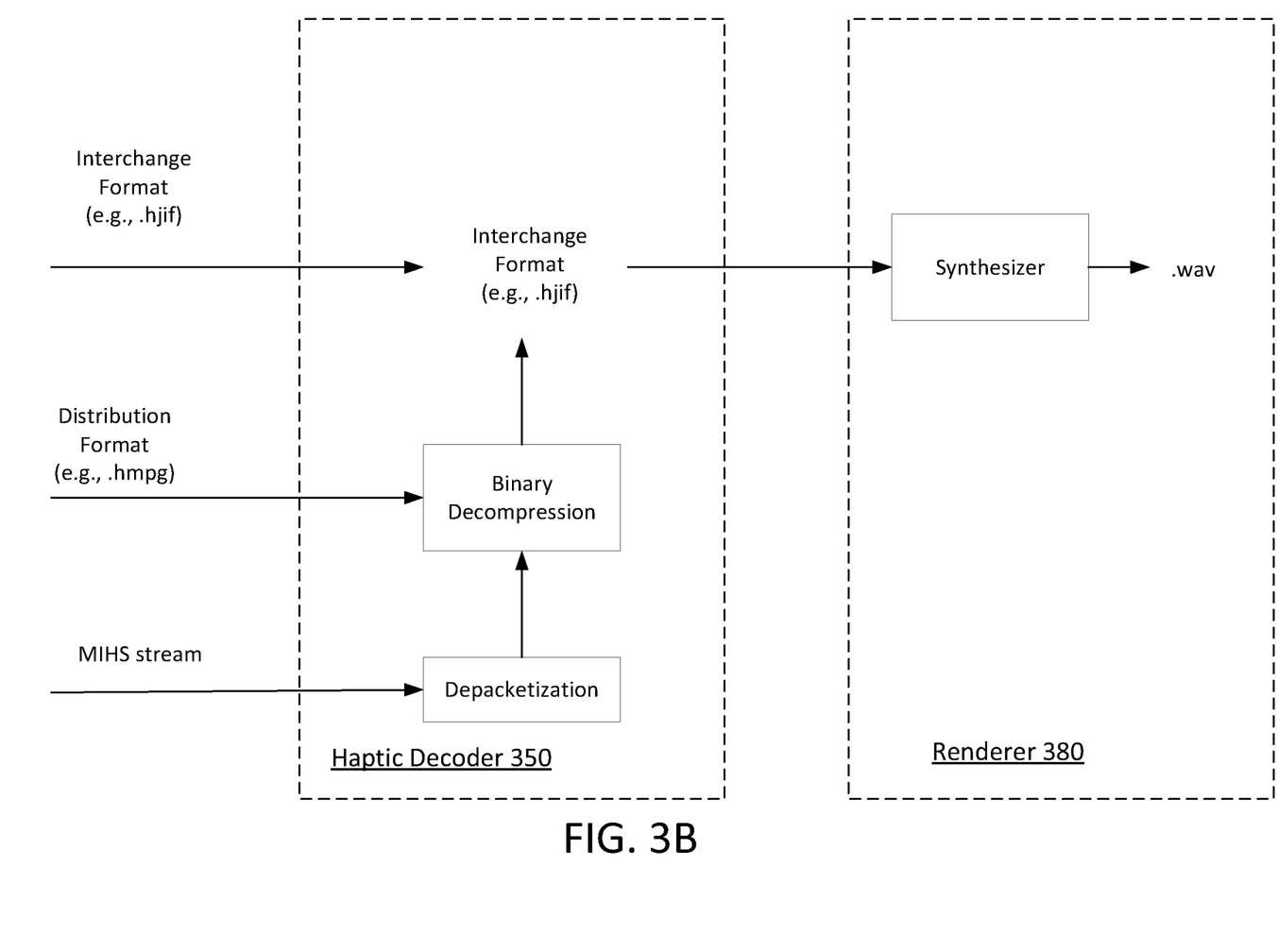
FIG. 3B is a schematic illustration of a simplified block diagram of a haptic decoder and haptic renderer, in accordance with embodiments of the present disclosure.

With reference to FIGS. 3A-B, an embodiment of the present disclosure for implementing haptic encoder 300 and haptic decoder 350 are described.

As shown in FIG. 3A, the haptic encoder 300 may receive both descriptive and waveform haptic data. Thus, the haptic encoder 300 may may be able to process three types of input files: .ohm metadata files (Object Haptic Metadata—Text file format for haptics metadata), descriptive haptics files (.ivs, .ahap, and .hjif) or waveform PCM files (.wav). An example of descriptive data may include .ahap (Apple Haptic and Audio Pattern—JSON-like file format that specifies a haptic pattern) from Apple (representing the expected haptic output by a set of modulated continuous signals and a set of modulated transients parametrized), .ivs from Immersion (representing the expected haptic output by a set of basis effects parametrized by a set of parameters), or .hjif (Haptics JSON Interchange Format) the proposed MPEG format. An example of the waveform pulse-code modulation (PCM) signals may include .ohm input files that include metadata information.

According to an embodiment, the haptic encoder 300 may process the two types of input files differently. For descriptive content, the haptic encoder 300 may analyze the input semantically to transcode (if necessary) the data into the proposed coded representation.

According to an embodiment, the .ohm metadata input file may include a description of the haptic system and setup. In particular, it may include the name of each associated haptic file (either descriptive or PCM) along with a description of the signals. It also provides a mapping between each channel of the signals and the targeted body parts on the user's body. For the .ohm metadata input file, the haptic encoder performs metadata extraction by retrieving the associated haptic files from the URI and encodes it based on its type and by extracting the metadata from the .ohm file and maps it to metadata information of the data model.

According to an embodiment, descriptive haptics files (e.g., .ivs, .ahap, and .hjif) may be encoded through a simple process. The haptic encoder 300 first identifies specifically the input format. If the input format is a .hjif file, then no transcoding is necessary, the file can be further edited, compressed into the binary format and eventually packetized into an MIHS stream. If .ahap or .ivs input files are used, a transcoding is necessary. The haptic encoder 300 first analyses the input file information semantically and transcodes it to be formatted into a selected data model. After transcoding, the data can be exported as the .hjif file, a .hmpg binary file or an MIHS stream.

According to an embodiment, the haptic encoder 300 may perform signal analysis to interpret the signal structure of the .wav files and convert it into the proposed encoded representation. For waveform PCM content, the signal analysis process may be split into two sub-processes by the haptic encoder 300. After performing a frequency band decomposition on the signal, at a first sub-process, low frequencies may be encoded using a keyframe extraction process. The low frequency band(s) may then be reconstructed and the error between this signal and the original low frequency signal may be computed. This residual signal may then be added to the original high frequency band(s), before encoding using Wavelet Transforms, the encoding using Wavelet Transforms being the second sub-process. According to an embodiment, when several low frequency bands are used, the residual errors from all the low frequency bands are added to the high frequency band before encoding. In embodiment when several high frequency bands are used, the residual errors from the low frequency band(s) are added to the first high frequency band before encoding.

According to an embodiment, keyframe extraction includes taking the lower frequency band from the frequency band decomposition and analysing its content in the time domain. According to an embodiment, wavelet processing may include taking the high frequency band from the frequency band decomposition and the low frequency residual, and splitting it into blocks of equal size. These signal blocks of equal size are then analysed in a psychohaptic model. The lossy compression may be applied by wavelet transforming the block and quantizing it, aided by the psychohaptic model. In the end, each block is then saved into a separate effect in a single band, which is done in the formatting. The binary compression may apply lossless compression using the appropriate coding techniques, e.g., the Set partitioning in hierarchical trees (SPIHT) algorithm and Arithmetic Coding (AC).

As shown in FIG. 3A, the haptic encoder 300 may be configured to encode descriptive and quantized haptic data and may output three types of formats—an interchange format (.hjif), a binary compressed format (.hmpg), and a streaming format (e.g., MPEG immersive haptic stream (MIHS)). The .hjif format is a human-readable format based on JSON and can easily be parsed and manually edited which makes it an ideal interchange format, especially when designing/creating content. For distribution purposes, the .hjif data can be compressed into a more memory efficient binary .hmpg bitstream. This compression may be lossy, with different parameters impacting the encoding depth of amplitude and frequencies composing the bitstream. For streaming purposes, the data can be compressed and packetized into a MPEG-I haptic stream (MIHS). The above-mentioned three formats have complementary purposes and a lossy one-to-one conversion may be operated between them.

As shown in FIG. 3B, the haptic decoder 350 may take as input either a .hmpg compressed binary file format or an MIHS bitstream. the haptic decoder 350 may output a .hjif interchange format that can be used directly for rendering. The two input formats may go through a binary decompression to extract both the metadata and the data itself from the file and map it to the selected data structure. Then, the data can be exported in the .hjif format to the haptic renderer 380.

As shown in FIG. 3B, the renderer 380 comprises a synthesizer. The synthesizer may render haptic data from a .hjif input file into a PCM output file. The rendering and/or synthesizing is informative. According to an embodiment, the synthesizer parses the input files and performs the high-level synthesis distribution between vectorial, wavelets, etc. The synthesis process then goes down to the Band component of the codec in which a synthesis process is called. Then all the bands of a given channel are mixed by a simple addition operator to recreate the desired haptic signal.

According to embodiments, the haptic experience defines the root of the hierarchical data model. It provides information on the date of the file and the version of the format, it describes the haptic experience, it lists the different avatars (i.e., body representation) used throughout the experience and it defines all the haptic perceptions.

According to an embodiment, a self-contained stream format to transport MPEG-I haptic data may use a packetized approach and may include two levels of packetization: MPEG-I haptic stream (MIHS) unit which covers a duration of time and includes zero or more MIHS packets and MIHS packet which includes metadata or haptic effect data.

In embodiments, each MIHS unit covers a nonoverlapping duration of haptic presentation time, i.e., it starts at the end of the previous MIHS unit and covers the duration of time defined by its duration field. The MIHS unit is followed by the next MIHS unit, unless it is the last MIHS unit of the haptic experience. All MIHS packets of a MIHS unit have the starting time and duration of the containing MIHS unit.

In embodiments, the MIHS unit may be referred to as a network abstraction layer unit associated with the haptic data. In embodiments, the MIHS unit may be referred to as a MIHS sample associated with the haptic data.

According to an embodiment, a MIHS unit may be a sync unit or a non-sync unit. A sync unit resets the previous effects and therefore provides an independent haptic experience from the previous MIHS units. A non-sync unit is the continuation of previous MIHS units and cannot be independently decoded and rendered without decoding the previous MIHS unit(s).

According to embodiments, haptic signals may be encoded on multiple channels. In some embodiments, a haptic channel may define a signal to be rendered at a specific body location with a dedicated actuator/device. Metadata stored at the channel level may include information such as the gain associated to the channel, the mixing weight, the desired body location of the haptic feedback and optionally the reference device and/or a direction. Additional information such as the desired sampling frequency or sample count may also be provided. Finally, the haptic data of a channel is contained in a set of haptic bands defined by their frequency range. A haptic band describes the haptic signal of a channel in a given frequency range. Bands are defined by a type and a sequential list of haptic effects each containing a set of keyframes. In embodiments, for every type of haptic band, haptic effects may be defined with at least a position and a type. Depending on the type of band and the type of effect, additional properties must be specified, including the phase, the base signal, a composition and a number of consecutive haptic keyframes describing the effect. For every type of haptic band, haptic effects may be defined with at least a position and a type. The position may indicate the temporal or spatial position of the effect. In some embodiments, value 0 is the relative starting position of the experience depending on the perception modality's dependent variable configured. The default unit for temporal haptic feedback may be milliseconds while it may be millimeters for spatial haptic feedback. The present embodiment discloses "starting position of the experience" because the binary distribution format does not have any concept of limited time interval, i.e. frames or samples.

Depending on the type of band and the type of effect, additional properties may be specified, including the phase, the base signal, a composition and a number of consecutive haptic keyframes describing the effect.

According to an embodiment of the present disclosure, a new element of frame may be defined in the haptic data hierarchy. Thus, according to an embodiment, each haptic channel consists of one or more frames. Each frame defines a duration of time and no two frames are overlapping.

According to an embodiment, new element called frame in the haptic data hierarchy is defined in the present disclosure.

Haptic Channels
  Haptic Frames
    Haptic Bands
      Haptic Effects

Figure 4:
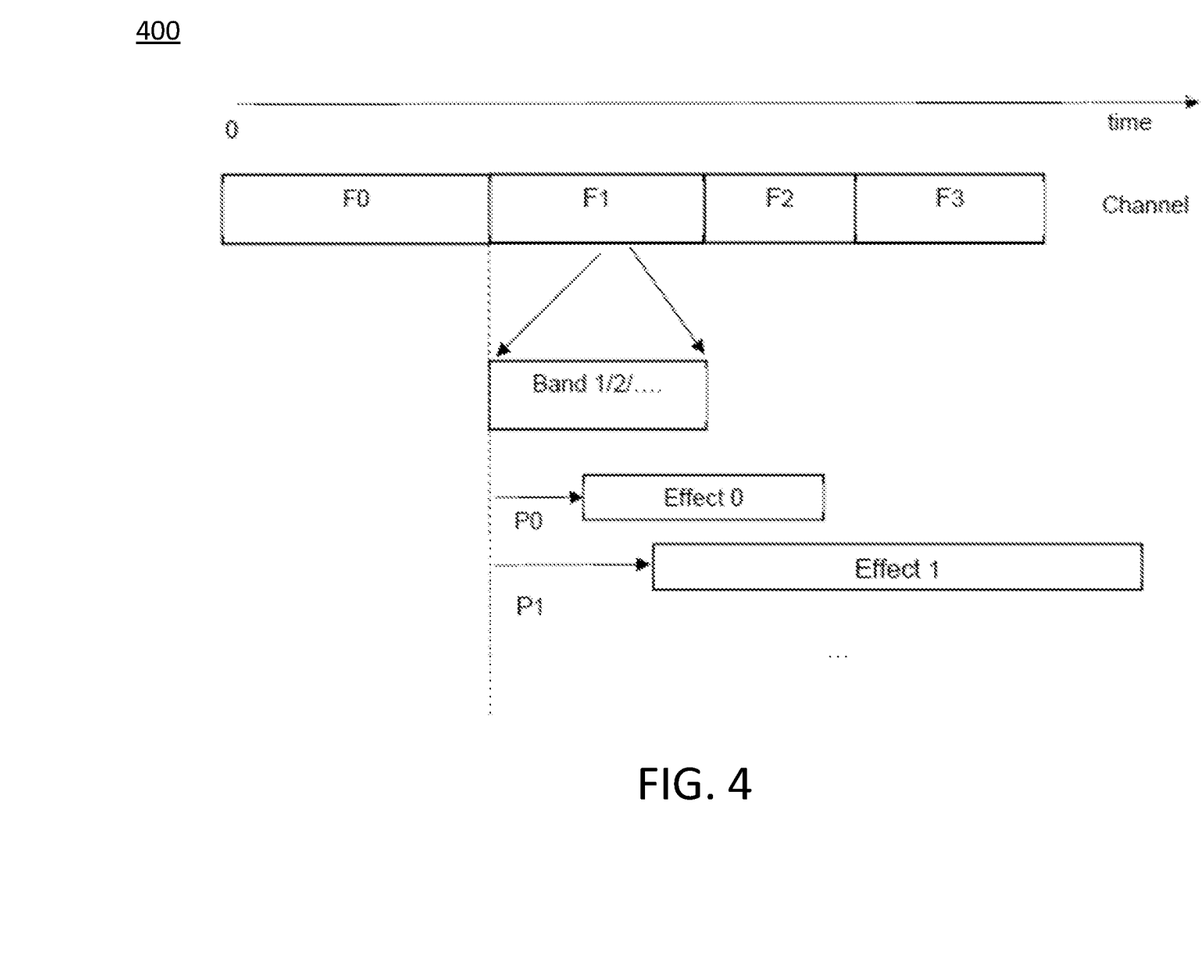
FIG. 4 is an exemplary illustration of haptic frames in accordance with embodiments of the present disclosure.

As shown in FIG. 4, each haptic channel consists of one or more frames. Each frame defines a duration of time and no two frames are overlapping. As shown in FIG. 4, an effect's temporal position is defined as an offset to the frame's start timing carrying that effect.

One immediate benefit of using haptic frames in the haptic elementary stream is that mapping the stream to ISOBMFF or any other temporal sample-based file format becomes efficient and easy. In an example, each frame of haptics is mapped to one ISOBMFF sample.

Embodiments of the present disclosure define a sync frame in the haptics to be a haptic frame that resets the output of all previous effects, i.e. if the player starts before or at this frame, the output would be identical. The value of such a frame is that it provides a random access point for the player. Any playback at this point provides a consistent playback regardless of the start time of play. The sync frames may translate to the sync samples in ISOBMFF, e.g., a sync frame is an ISOBMFF sync sample. Therefore the random access properties of a sync frame may be used at the system layer.

Figure 5:
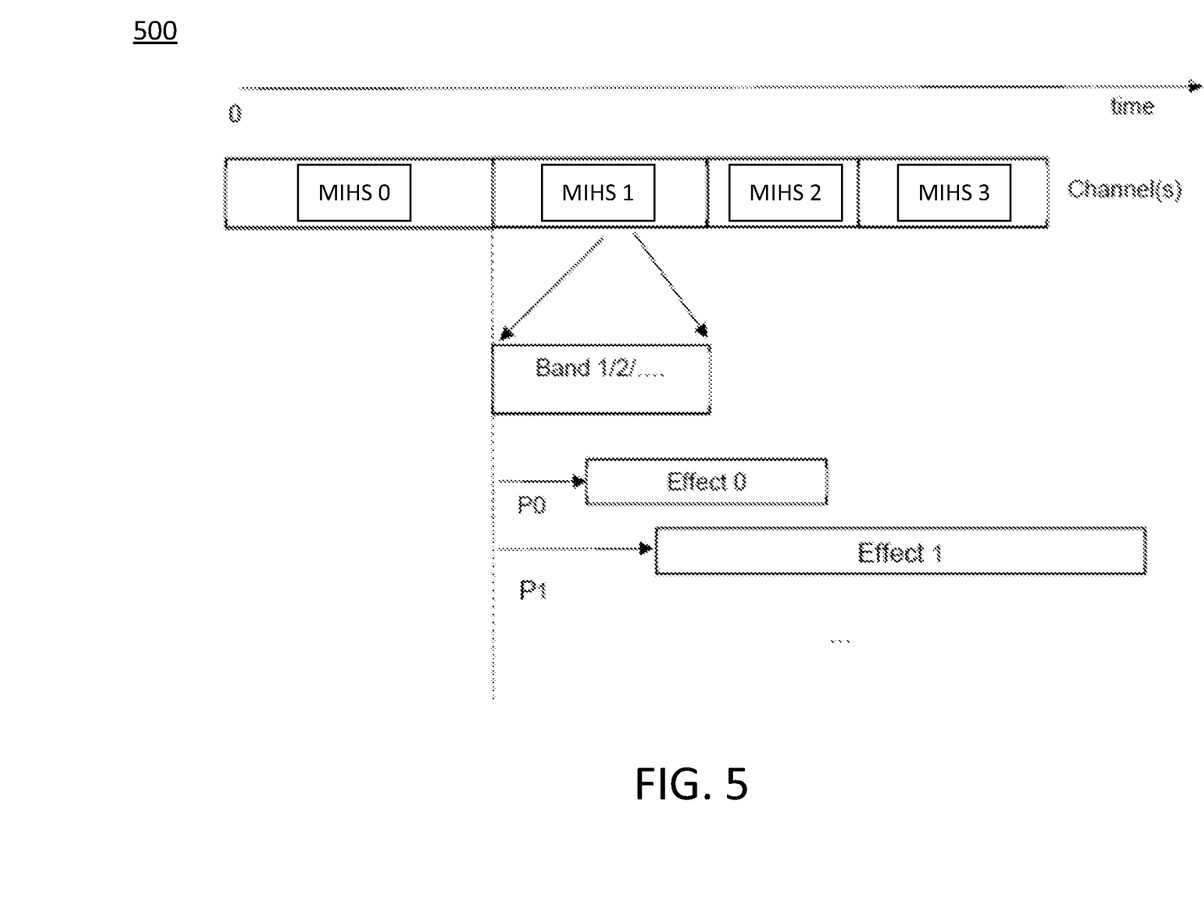
FIG. 5 is an exemplary illustration of MIHS units in accordance with embodiments of the present disclosure.

Another aspect of the present disclosure, as an alternative to or in combination with the haptic frame as disclosed herein, a network abstract layer (also referred to as MPEG immersive haptic stream (MIHS) unit) may provide the timing information for the haptic channels as shown in FIG. 5. In embodiments, the NAL units are interchangeably referred to as MIHS unit.

In an embodiment, the MIHS units may have the required timing information (start time and/or duration). One or more channels can be put in one MIHS unit in contrast to the channel frames. It should be noted that the haptic distribution syntax should include the MIHS unit syntax. Similar to video NAL unit types, the MIHS units may be defined with a sync/random access type or non-sync types to identify random access. Again, a sync MIHS unit resets all prior haptic effects and starts one or more new effects.

According to an embodiment, it is possible to include both frames and timed-referenced MIHS units in the haptic streams. In this embodiment, one or more frames can be included in timed-referenced MIHS units. The timing information on the MIHS unit may become optional.

Figure 6:
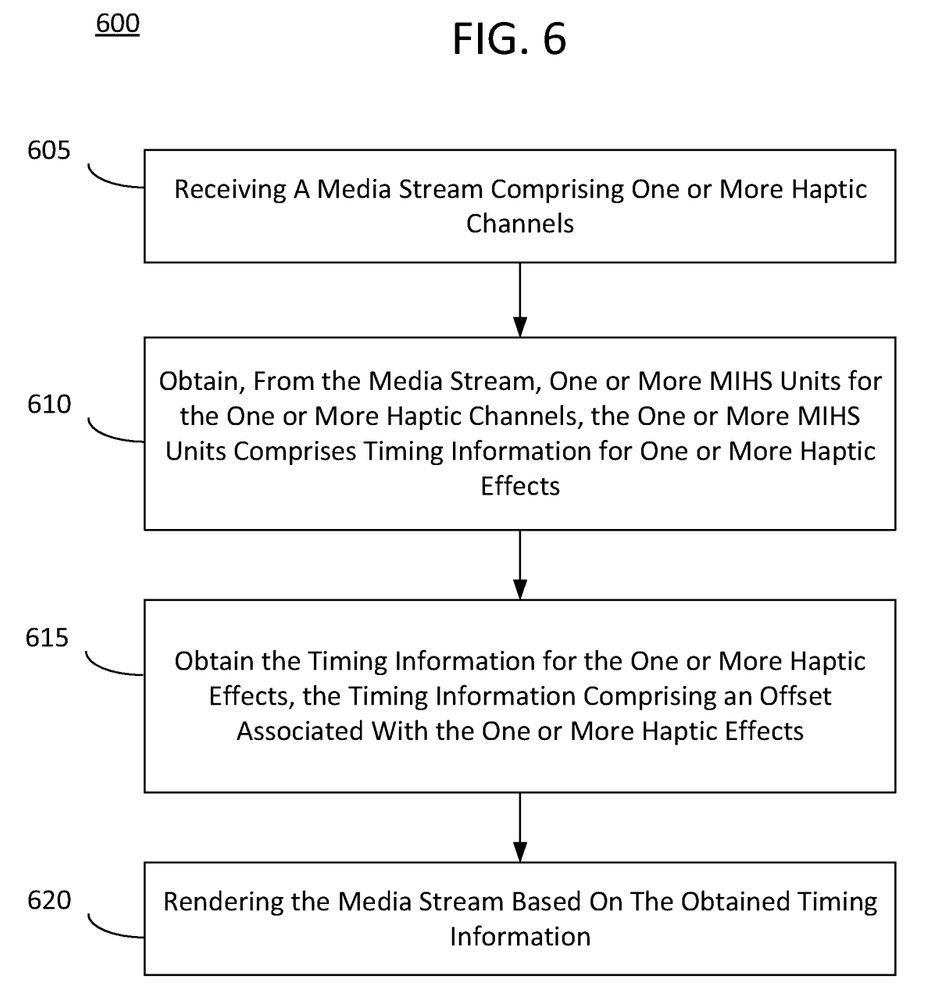
FIG. 6 is an exemplary flow diagram illustrating a process for processing haptic media in accordance with embodiments of the present disclosure.

As shown in FIG. 6, process 600 illustrates an exemplary process for decoding haptic data.

At operation 605, a media stream including one or more haptic channels may be received. In some embodiments, the media stream may include one or more audio/video channels. In some embodiments, as an example, the media stream may include a .ahap, a .hjif, or a .ivs input stream.

At operation 610, one or more moving picture experts group (MPEG) immersive haptics stream (MIHS) units for the one or more haptic channels may be obtained from the media stream. In embodiments, the MIHS unit may include timing information for one or more haptic effects. In some embodiments, each of the one or more haptic channels has at least one associated MIHS unit. The MIHS unit may also include one or more haptic frames, each haptic frame being associated with a non-overlapping duration in the MIHS unit.

At operation 615, the timing information for the one or more haptic effects from the one or more MIHS units may be obtained. In embodiments, the timing information for the one or more haptic effects comprises an offset associated with the one or more haptic effects.

In embodiments, the MIHS unit includes a MIHS start time that is used as an anchor for a starting of the one or more haptic effects, with the offset associated with the one or more haptic effects indicates an effect start time respective to the MIHS start time.

In embodiments, the MIHS unit further comprises timing information for one or more haptic bands, which further begets an operation to obtain the timing information for the one or more haptic bands from the one or more MIHS units, the timing information for the one or more haptic bands including an offset associated with the one or more haptic bands.

In embodiments, the MIHS unit may include a MIHS start time that is used as an anchor for a starting of the one or more haptic bands, and the offset associated with the one or more haptic bands indicates a band start time respective to the MIHS start time.

At operation 620, the media stream is rendered based on the obtained timing information.

In some embodiments, a sync MIHS unit may be obtained from the media stream. In embodiments, the sync MIHS unit is a special type of MIHS unit configured to provide a reset point in the bitstream. In embodiments, the sync MIHS unit is mapped to a sync sample in a video bitstream corresponding to the one or more haptic channels.

A person of skill in the art understands that he techniques described herein may be implemented on both the encoder side and the decoder side. The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
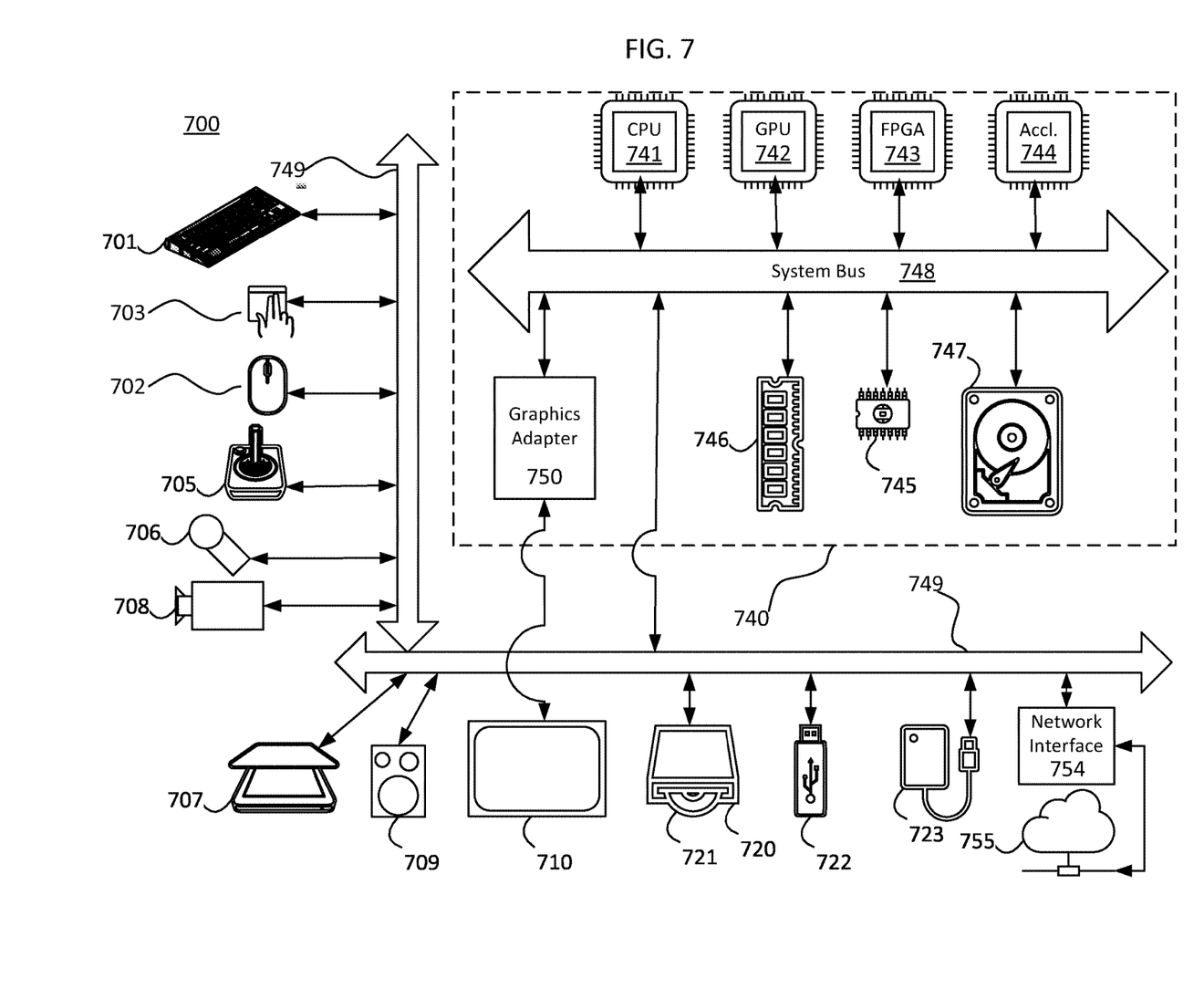
FIG. 7 is a diagram of a computer system suitable for implementing embodiments.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, a computer system having the architecture of computer system 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding information for haptic data, the method being performed by at least one processor, the method comprising:
    receiving, a bitstream comprising one or more haptic channels;
    obtaining, from the bitstream, one or more moving picture experts group (MPEG) immersive haptics stream (MIHS) units for the one or more haptic channels,
        wherein a MIHS unit comprises timing information for one or more haptic effects and timing information for one or more haptic bands;
    obtaining the timing information for the one or more haptic effects from the one or more MIHS units, the timing information for the one or more haptic effects comprises an offset associated with the one or more haptic effects;
    obtaining the timing information for the one or more haptic bands from the one or more MIHS units, the timing information for the one or more haptic bands comprises an offset associated with the one or more haptic bands; and
    decoding the bitstream based on the timing information for the one or more haptic effects and the timing information for the one or more haptic bands.

2. The method of claim 1, wherein the method further comprises:
    obtaining, from the bitstream, a sync MIHS unit,
        wherein the sync MIHS unit is a special type of MIHS unit configured to provide a reset point in the bitstream, and
        wherein the sync MIHS unit is mapped to a sync sample in a video bitstream corresponding to the one or more haptic channels.

3. The method of claim 1, wherein the MIHS unit comprises a MIHS start time that is used as an anchor for a starting of the one or more haptic effects, and
    wherein the offset associated with the one or more haptic effects indicates an effect start time respective to the MIHS start time.

4. The method of claim 1, wherein the MIHS unit comprises a MIHS start time that is used as an anchor for a starting of the one or more haptic bands, and
    wherein the offset associated with the one or more haptic bands indicates a band start time respective to the MIHS start time.

5. The method of claim 1, wherein each of the one or more haptic channels has at least one associated MIHS unit.

6. The method of claim 1, wherein the MIHS unit further comprises one or more haptic frames, each haptic frame being associated with a non-overlapping duration in the MIHS unit.

7. An apparatus for decoding haptic data, the apparatus comprising:
    at least one memory configured to store program code; and
    at least one processor configured to read the program code and operate as instructed by the program code, the program code including:
        first receiving code configured to cause the at least one processor to receive a bitstream comprising one or more haptic channels;
        first obtaining code configured to cause the at least one processor to obtain from the bitstream, one or more moving picture experts group (MPEG) immersive haptics stream (MIHS) units for the one or more haptic channels,
            wherein a MIHS unit comprises timing information for one or more haptic effects and timing information for one or more haptic bands;
        second obtaining code configured to cause the at least one processor to obtain the timing information for the one or more haptic effects from the one or more MIHS units, the timing information for the one or more haptic effects comprises an offset associated with the one or more haptic effects;
        third obtaining code configured to cause the at least one processor to obtain the timing information for the one or more haptic bands from the one or more MIHS units, the timing information for the one or more haptic bands comprises an offset associated with the one or more haptic bands; and
        rendering code configured to cause the at least one processor to render the bitstream based on the timing information for the one or more haptic effects and the timing information for the one or more haptic bands.

8. The apparatus of claim 7, wherein the program code further comprises:
    fourth obtaining code configured to cause the at least one processor to obtain, from the bitstream, a sync MIHS unit,
        wherein the sync MIHS unit is a special type of MIHS unit configured to provide a reset point in the bitstream, and
        wherein the sync MIHS unit is mapped to a sync sample in a video bitstream corresponding to the one or more haptic channels.

9. The apparatus of claim 7, wherein the MIHS unit comprises a MIHS start time that is used as an anchor for a starting of the one or more haptic effects, and
    wherein the offset associated with the one or more haptic effects indicates an effect start time respective to the MIHS start time.

10. The apparatus of claim 7, wherein the MIHS unit comprises a MIHS start time that is used as an anchor for a starting of the one or more haptic bands, and
    wherein the offset associated with the one or more haptic bands indicates a band start time respective to the MIHS start time.

11. The apparatus of claim 7, wherein each of the one or more haptic channels has at least one associated MIHS unit.

12. The apparatus of claim 7, wherein the MIHS unit further comprises one or more haptic frames, each haptic frame being associated with a non-overlapping duration in the MIHS unit.

13. A non-transitory computer-readable medium storing instructions, the instructions comprising: one or more instructions that, when executed by one or more processors of a device for decoding haptic data, cause the one or more processors to:

receive a bitstream comprising one or more haptic channels;

obtain, from the bitstream, one or more moving picture experts group (MPEG) immersive haptics stream (MIHS) units for the one or more haptic channels,
wherein a MIHS unit comprises timing information for one or more haptic effects and timing information for one or more haptic bands;

obtain the timing information for the one or more haptic effects from the one or more MIHS units, the timing information for the one or more haptic effects comprises an offset associated with the one or more haptic effects;

obtain the timing information for the one or more haptic bands from the one or more MIHS units, the timing information for the one or more haptic bands comprises an offset associated with the one or more haptic bands; and render the bitstream based on the timing information for the one or more haptic effects and the timing information for the one or more haptic bands.

14. The non-transitory computer-readable medium of claim 13, wherein the instructions further cause the one or more processors to obtain, from the bitstream, a sync MIHS unit,
wherein the sync MIHS unit is a special type of MIHS unit configured to provide a reset point in the bitstream, and
wherein the sync MIHS unit is mapped to a sync sample in a video bitstream corresponding to the one or more haptic channels.

15. The non-transitory computer-readable medium of claim 13, wherein the MIHS unit comprises a MIHS start time that is used as an anchor for a starting of the one or more haptic effects, and
wherein the offset associated with the one or more haptic effects indicates an effect start time respective to the MIHS start time.

16. The non-transitory computer-readable medium of claim 13, wherein the MIHS unit comprises a MIHS start time that is used as an anchor for a starting of the one or more haptic bands, and wherein the offset associated with the one or more haptic bands indicates a band start time respective to the MIHS start time.

17. The non-transitory computer-readable medium of claim 13, wherein the MIHS unit further comprises one or more haptic frames, each haptic frame being associated with a non-overlapping duration in the MIHS unit.

* * * * *